W. S. HASSKARL.
DRAINER FOR DISHES.
APPLICATION FILED APR. 25, 1919.
1,363,590. Patented Dec. 28, 1920.
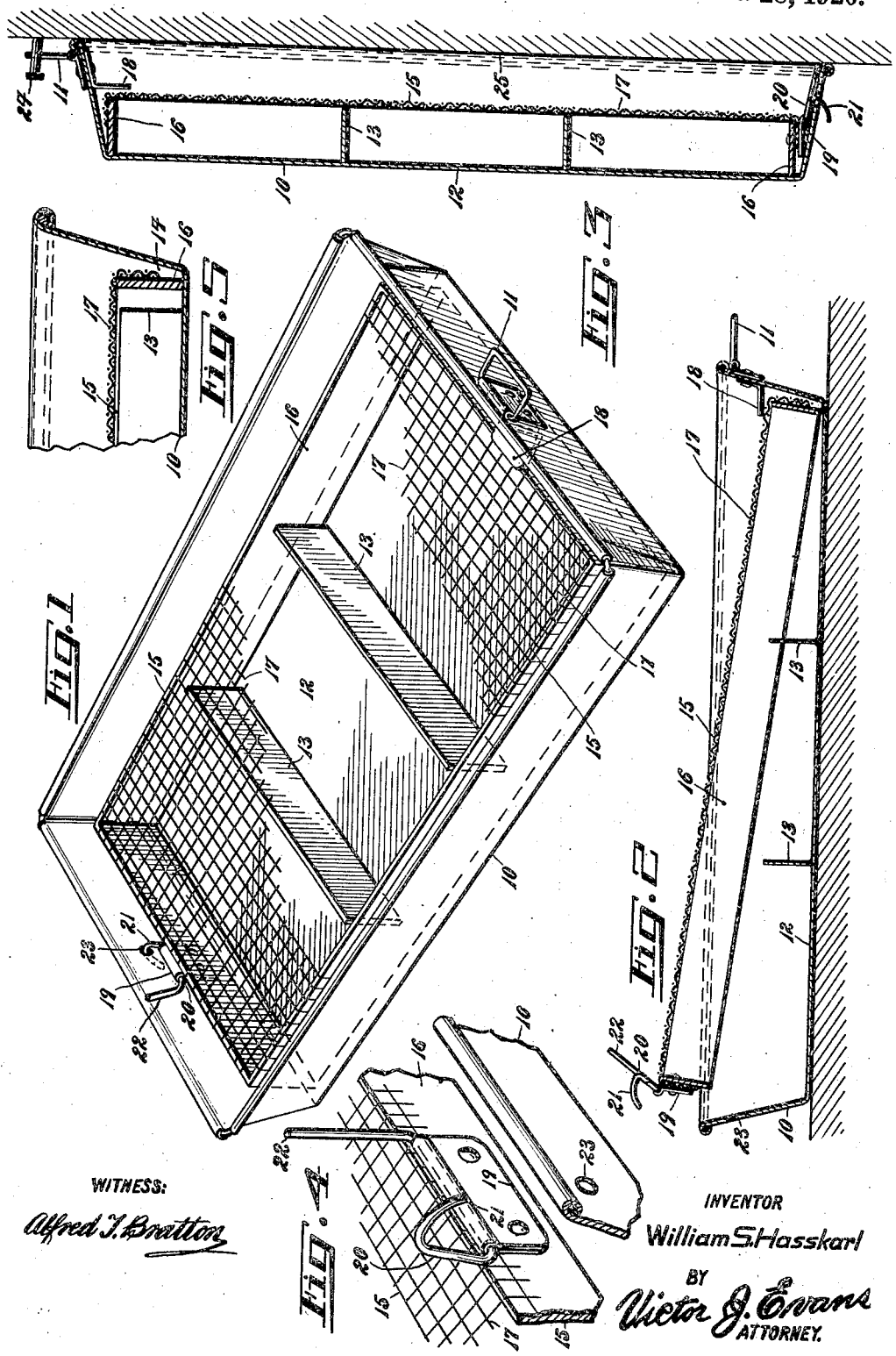
WITNESS:
Alfred T. Bratton
INVENTOR
William S. Hasskarl
BY
Victor J. Evans
ATTORNEY.

UNITED STATES PATENT OFFICE.

WILLIAM S. HASSKARL, OF PHILADELPHIA, PENNSYLVANIA.

DRAINER FOR DISHES.

1,363,590.　　　　　Specification of Letters Patent.　　Patented Dec. 28, 1920.

Application filed April 25, 1919. Serial No. 292,620.

*To all whom it may concern:*

Be it known that I, WILLIAM S. HASSKARL, a citizen of the United States, residing at Philadelphia, in the county of Philadelphia and State of Pennsylvania, have invented new and useful Improvements in Drainers for Dishes, of which the following is a specification.

The invention relates to kitchen utensils, and has for an object to provide a drainer and pan for use in the draining of dishes, to effectively support the dishes in position so that the water will readily be drained therefrom.

Among other features the invention comprises a drainer for dishes which is of a compact nature and in which the usual tray can be readily supported in position when the device is in use, and held in its position in the pan when the device is hung up in an out of the way place, the tray however being readily removable when desired, so that access can be had to the interior of the pan.

In the further disclosure of the invention reference is to be had to the accompanying drawings constituting a part of this specification, in which similar characters of reference denote corresponding parts in all the views, and in which,—

Figure 1—is a perspective view of the device, parts of the tray being broken away to disclose the underlying structure.

Fig. 2—is a vertical sectional view taken through the device with the tray shown in partly removed position.

Fig. 3—is a vertical sectional view taken through the device showing the manner of supporting the same on the wall or bracket, when not in use.

Fig. 4—is a fragmentary enlarged perspective view showing the securing device for securing the tray in the pan, the said securing device in this view being shown in disengaged relation with the pan, and Fig. 5—is a fragmentary vertical transverse sectional view taken through the pan and tray.

Referring more particularly to the views, the numeral 10 indicates a pan-like body which may be of any desired construction and which at one end is provided with a handle 11. The bottom 12 of the pan is provided with a plurality of transverse ribs 13 which however do not extend entirely across the bottom and as shown in Fig. 5, the ends of the ribs with the side wall of the pan, form passages 14, so that any water which drips into the pan, can readily flow toward one end thereof. The ribs 13 are primarily provided to support the central portion of a tray 15, the latter being of a wire-like construction and including a rectangular frame 16, with an overlying wire mesh 17, the ends of the frame 16, being adapted to repose upon the bottom 12 of the pan adjacent the ends of the pan with the sides 17 resting upon the bottom of the pan adjacent the sides thereof, and passing through the passages 14, as shown in Fig. 5.

At one end of the pan body 10, there is provided an inwardly extending ledge 18 which may be suitably secured to the inner face of that end of the pan in any convenient manner, and the opposite end of the tray has secured thereto, a suitable bracket 19 on which is mounted to swing a securing element 20 preferably formed of a single piece of wire-like material bent to form a hook 21 and a handle 22, with the said element 20 pivoted upon the bracket 19 in such a manner that the hook 21 thereof, can be arranged to extend through an opening 23 in the end of the pan as shown in Figs. 1, 3. With this construction it will be seen that the tray will be substantially supported in the pan when the pan is in position for use, as shown in Fig. 1, and that when the pan is hung up upon a suitable nail or hook 24 to rest against a wall 25, the locking of the tray in the pan, by the provision of the ledge or extension 18 and the securing element 20, holds the tray from accidental removal from the pan as clearly set forth in Fig. 3. By simply actuating the handle 22, the securing element 20 can be swung to remove the hook 21 from the pan 23 and then that end of the tray can easily be lifted as shown in Fig. 2, so as to permit of the entire removal of the tray from the pan.

It will be understood that I do not limit myself to the precise construction set forth herein or illustrated in the drawing; that various slight changes may be made without departing from the spirit of the invention and that the scope thereof is defined in the appended claims.

Having described my invention, I claim,—

1. In combination, a receptacle having an opening in one end wall thereof, a member projecting from the opposed end thereof, a tray removably positioned within the receptacle, and having one end positioned beneath said member, and a hook journaled upon one end of the tray and wholly disposed above the upper surface thereof, said hook being adapted to be passed through the opening of the receptacle for holding the tray and receptacle associated.

2. In combination, a receptacle having an opening in one end wall thereof, a member projecting from the inner side of the opposite end wall of the receptacle, a tray removably positioned within the receptacle and having one end positioned beneath said member, an element having a cross piece journaled upon one end of the tray, an extension at one end of said cross piece curved to provide a hook adapted to be positioned within the opening of the receptacle to hold the tray and receptacle associated, a finger piece projecting from the other end of said cross piece.

In testimony whereof I affix my signature.

WILLIAM S. HASSKARL.